United States Patent
Kwak et al.

(10) Patent No.: US 12,241,654 B2
(45) Date of Patent: Mar. 4, 2025

(54) WATER HEATER RECEIVING HUMIDIFIED AIR

(71) Applicant: KYUNGDONG NAVIEN CO., LTD., Gyeonggi-do (KR)

(72) Inventors: Suk Chul Kwak, Seoul (KR); In Soo Hwang, Seoul (KR)

(73) Assignee: Kyungdong Navien Co., Ltd., Gyeonggi-do (KR)

( * ) Notice: Subject to any disclaimer, the term of this patent is extended or adjusted under 35 U.S.C. 154(b) by 64 days.

(21) Appl. No.: 17/907,632

(22) PCT Filed: Sep. 24, 2021

(86) PCT No.: PCT/KR2021/013078
§ 371 (c)(1),
(2) Date: Sep. 28, 2022

(87) PCT Pub. No.: WO2022/065937
PCT Pub. Date: Mar. 31, 2022

(65) Prior Publication Data
US 2023/0139832 A1  May 4, 2023

(30) Foreign Application Priority Data
Sep. 25, 2020 (KR) .......... 10-2020-0125212

(51) Int. Cl.
*F24H 1/00* (2022.01)
*F23C 9/00* (2006.01)
(Continued)

(52) U.S. Cl.
CPC ......... *F24H 1/0027* (2013.01); *F23C 9/00* (2013.01); *F23L 7/005* (2013.01); *F23L 15/04* (2013.01);
(Continued)

(58) Field of Classification Search
CPC .................. F23L 7/005; F23L 7/002
See application file for complete search history.

(56) References Cited

U.S. PATENT DOCUMENTS

2002/0153133 A1* 10/2002 Haglid ............... F24F 5/0035
165/250
2015/0308711 A1* 10/2015 Gillan ............... F24H 8/003
122/18.4
(Continued)

FOREIGN PATENT DOCUMENTS

GB 2423141 A * 8/2006 ............ F23N 5/242
JP 2005241184 A * 9/2005
(Continued)

OTHER PUBLICATIONS

KR-2020073720-A English translation (Year: 2020).*
(Continued)

*Primary Examiner* — Michael G Hoang
*Assistant Examiner* — Kurt J Wolford (57) ABSTRACT

A water heater according to the present invention includes: a heating unit that includes a burner provided to cause a combustion reaction from air and fuel, and that is provided to generate heated water by using heat generated by the combustion reaction; and a humidifier unit that generates water steam by evaporating water using a combustion gas generated by the combustion reaction and discharged from the heating unit, and provides the water steam together with the air to the burner.

10 Claims, 10 Drawing Sheets

(51) Int. Cl.

| | | |
|---|---|---|
| *F23L 7/00* | (2006.01) | |
| *F23L 15/04* | (2006.01) | |
| *F24H 8/00* | (2022.01) | |
| *F24H 9/00* | (2022.01) | |
| *F28D 5/00* | (2006.01) | |
| *F28D 7/16* | (2006.01) | |

(52) U.S. Cl.
CPC ............... *F24H 8/006* (2013.01); *F28D 5/00* (2013.01); *F24H 9/0084* (2013.01); *F28D 7/1653* (2013.01); *F28F 2245/02* (2013.01)

(56) References Cited

U.S. PATENT DOCUMENTS

| | | | |
|---|---|---|---|
| 2015/0362214 A1 | 12/2015 | Park et al. | |
| 2017/0276383 A1* | 9/2017 | Gilbert | ................ F28D 5/00 |
| 2017/0328639 A1* | 11/2017 | Clarkson | ............ F24F 1/0059 |

FOREIGN PATENT DOCUMENTS

| | | | | | |
|---|---|---|---|---|---|
| JP | 2014-080921 A | | 5/2014 | | |
| KR | 10-2014-0106261 A | | 9/2014 | | |
| KR | 10-2015-0084194 A | | 7/2015 | | |
| KR | 20150084194 A | * | 7/2015 | | |
| KR | 10-2016-0141016 A | | 12/2016 | | |
| KR | 10-1692240 B | | 1/2017 | | |
| KR | 10-1975888 B | | 5/2019 | | |
| KR | 10-2020-0061715 A | | 6/2020 | | |
| KR | 10-2020-0073720 A | | 6/2020 | | |
| KR | 10-2020-0075244 A | | 6/2020 | | |
| KR | 2020073720 A | * | 6/2020 | ............ | F24F 5/0035 |
| KR | 20200075244 A | * | 6/2020 | | |

OTHER PUBLICATIONS

JP-2005241184-A English translation (Year: 2005).*
KR-20150084194-A English translation (Year: 2015).*
KR-20200075244-A English translation (Year: 2020).*
Lotusleaf, Hydrophil for HVAC (Year: 2018).*
Wayback Machine, Lotusleaf (Year: 2018).*

* cited by examiner

WATER HEATER RECEIVING HUMIDIFIED AIR

TECHNICAL FIELD

The present disclosure relates to a water heater that receives humidified air.

BACKGROUND ART

A water heater that discharges heated water or heats water for heating generally achieves a specific purpose by causing a combustion reaction and transferring heat generated through the combustion reaction to water. The heating water generated by heating water may be provided for heating, and may be discharged to a source of demand to be used.

The water heater has a burner to cause a combustion engine. The burner may cause the combustion by igniting the introduced fuel and air for combustion. It is necessary to provide a temperature and a humidity that are suitable for the provided air for an efficient combustion. When air having a suitable temperature and a suitable humidity is supplied to the burner, nitrogen oxides (NOx) may be reduced. It is very important to reduce nitrogen oxides in a situation, in which an atmospheric contaminant discharge reference for a boiler becomes higher over time.

In general, exterior air is directly supplied to the water heater, and the air directly supplied from an outside may not include a sufficient humidity, or a specific humidity cannot be maintained according to a difference of seasons and days and nights.

DISCLOSURE

Technical Problem

An aspect of the present disclosure provides a water heater that receives humidified air.

Technical Solution

According to an embodiment of the present disclosure, a water heater includes a heating part including a burner that causes a combustion reaction from air and a fuel, and that generates heating water by using heat generated through the combustion reaction, and a humidification part that generates steam by steaming water by using a combustion gas generated through the combustion reaction and discharged from the heating part, and to provide the steam, together with the air, to the burner.

According to another embodiment of the present disclosure, a water heater includes a heating part including a burner that causes a combustion reaction from air and a fuel, a heating water heat exchanger that receives sensible heat and latent heat from a combustion gas generated through the combustion reaction to generate heating water by heating water, and a hot water heat exchanger that generates hot water by exchanging heat between the heating water and direct water, a humidification part that generates steam by steaming water by using the combustion gas, and through which the air passes, a water discharge pipeline that discharges condensate generated through condensation of the combustion gas, an air supply pipeline connecting the humidification part and the heating part to provide the air that passed through the humidification part, together with steam generated by the humidification part, to the burner, and an intermediate pipeline connecting the humidification part and the heating part to deliver the combustion gas to the humidification part.

Advantageous Effects

Accordingly, the humidified air may be provided to the burner, and an amount of nitrogen oxides generated by the water heater may be reduced.

MODE FOR INVENTION

This application claims the benefit of priority to Korean Patent Application No. 10-2020-0125212, filed in the Korean Intellectual Property Office on Sep. 25, 2020, the entire contents of which are incorporated herein by reference.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First Embodiment

Figure 1:
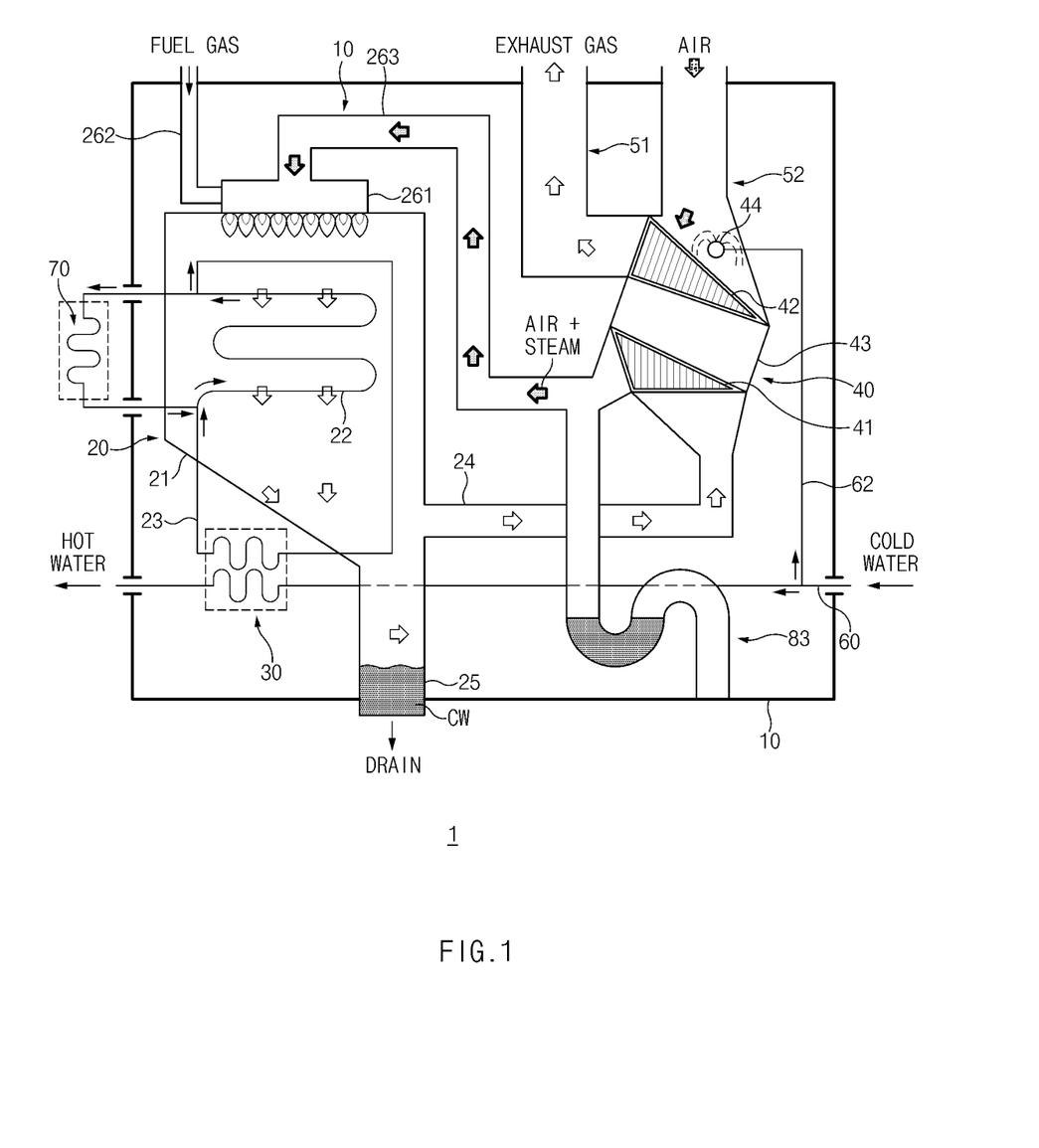
FIG. 1 is a conceptual view of a water heater according to a first embodiment of the present disclosure.

FIG. 1 is a conceptual view of a water heater 1 according to a first embodiment of the present disclosure.

Referring to the drawing, the water heater 1 according to the first embodiment of the present disclosure includes a heating part 20 and a humidification part 40. The water heater 1 may further include a case 10 for embedding other components, a duct 51 that passes through the case 10 and is configured such that a combustion gas that passed through the humidification part 40 is discharged to an outside, and an external air supply pipeline 52 that passes through the case 10 and introduces air outside the case 10 into an interior of the case 10. The water heater may include a boiler for providing heating, a hot water heater for providing hot water (a direct water type hot water heater that is not provided with a separate hot water tank, or a tank type hot water heater provided with a separate hot water tank), a boiler usable for a hot water heater, or the like. Hereafter, a boiler usable for a hot water heater will be described as an example.

Heating Part 20

The heating part 20 is configured to cause a combustion reaction and generate heating water by using heat generated therefrom. The heating water includes at least one of heating water or hot water. The heating part 20 includes a burner 26. The heating part 20 may include a heat exchanger.

The burner 26 is configured to cause a combustion reaction from air and a fuel. Accordingly, the burner 26 may include a burner air supply pipeline 263 that receives air, a fuel pipeline 262 that receives the fuel, and a combustion part 261 that causes the combustion reaction by using the received air and fuel.

The heating part 20 may include a combustion chamber, in which flames generated through the combustion reaction may be located. The heating part 20 may include a housing 21 to define a combustion chamber in the housing 21. Water may be injected into an interior of the combustion chamber such that a temperature of the combustion gas is within a specific range. As in the contents on the humidification part 40, which will be described below, the water may be injected in a scheme, in which the water is sprayed into the interior of the combustion chamber, by using a nozzle or the like. The water injected into the combustion chamber may be condensate CW formed through condensation of a combustion gas.

The heat exchanger of the heating part 20 may include a heating water heat exchanger 22 and a hot water heat exchanger 30. The heating water heat exchanger 22 may be embedded in the housing 21. The heating water heat exchanger 22 may generate heating water by heating water by using convection heat generated through the combustion reaction, and sensible heat and latent heat received from the combustion gas generated from flames located in the combustion chamber. Accordingly, the heating water heat exchanger 22 may be formed in a form of a pipeline, through which water may flow and in which the combustion gas may flow along an outer surface thereof. The heating water heat exchanger 22 may further include heat transfer fins for increasing a heat transfer area thereof. However, the form of the heating water heat exchanger 22 is not limited thereto, and may be of a plate type. The heating water heat exchanger 22 may include a sensible heat type heat exchanger that uses sensible heat, and a latent heat type heat exchanger that uses latent heat. The heating water may be heated first in the latent heat type heat exchanger, and may be heated finally by the sensible heat type heat exchanger. In the drawing, it may be considered that the latent heat type heat exchanger is located on a lower side and the sensible heat type heat exchanger is located on an upper side.

The heating water may be delivered to a heating pipeline 70 located in a heating target that requires external heating to be used as the heating water. A closed circuit that allows the heating water to return to the heating water heat exchanger 22 in an interior of the heating part 20 such that the heating water is circulated after heat is transferred to the heating target may be formed.

The heating water may be delivered to the hot water heat exchanger 30 by a circulation pipeline 23 connected to the heating water heat exchanger 22 to be used to generate hot water. Opposite ends of the circulation pipeline 23 may be connected to the heating water heat exchanger 22 and may be configured such that the heating water is circulated. The hot water heat exchanger 30 may be disposed outside the housing 21, but may be disposed in an interior of the housing 21. The hot water heat exchanger 30 may receive direct water and generate hot water by exchanging heat with the heating water. The hot water may be discharged to a source of demand to be used. The hot water heat exchanger 30 may be configured such that a hot water direct water pipeline 61 passes therethrough such that the direct water is introduced from the outside and is discharged after becoming hot water. A direct water pipeline 60, through which direct water is introduced from the outside to an interior of the case 10 may be divided into the hot water direct water pipeline 61 and a humidifying direct water pipeline 62.

Although it has been described in the first embodiment of the present disclosure that the heat exchanger includes the heating water heat exchanger 22 and the hot water heat exchanger 30, it may include only one of the heating water heat exchanger 22 and the hot water heat exchanger 30, and the hot water heat exchanger 30 of a type that directly uses heat generated through a combustion reaction in heating hot water may be used. The heating part 20 is not limited to the one described and illustrated in the first embodiment of the present disclosure, and may be formed of a hot water storage type.

The combustion gas may be condensed to generate condensate CW. The condensate CW may be discharged through a water discharge pipeline 25 located at a lower end of the heating part 20. A trap may be disposed in the water discharge pipeline 25 such that the combustion gas is prevented from being discharged therethrough, and a neutralization device may be disposed to neutralize and discharge the condensate CW that is acidic.

To provide the combustion gas to the humidification part 40, which will be described below, the heating part 20 may further include an intermediate pipeline 24 that connects the housing 21 and the humidification part 40. The intermediate pipeline 24 may deliver the combustion gas that passed through the heat exchanger to exchange heat to the humidification part 40.

Humidification Part 40

Figure 2:
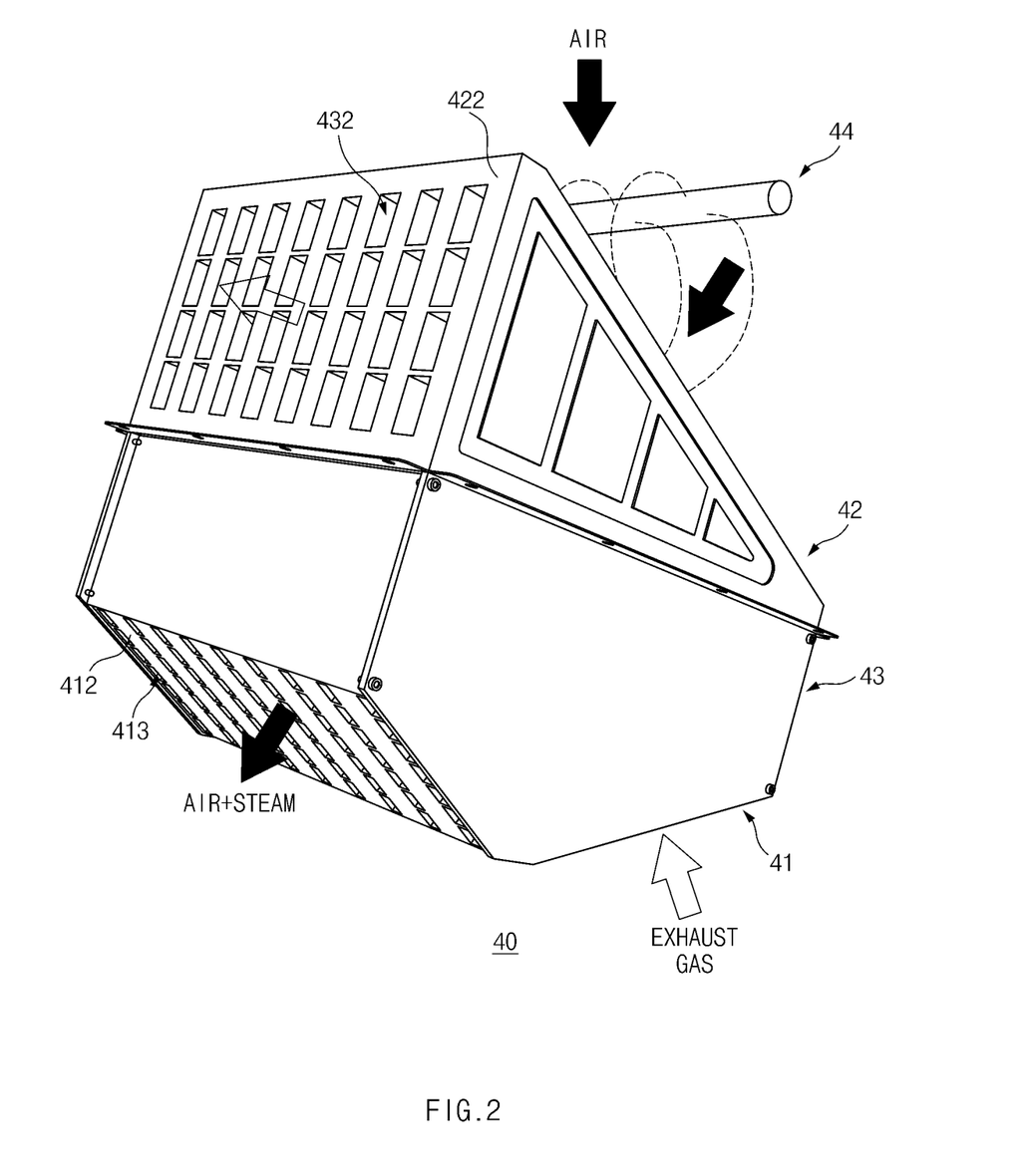
FIG. 2 is a perspective view illustrating a humidification part of a water heater according to the first embodiment of the present disclosure.
Figure 3:
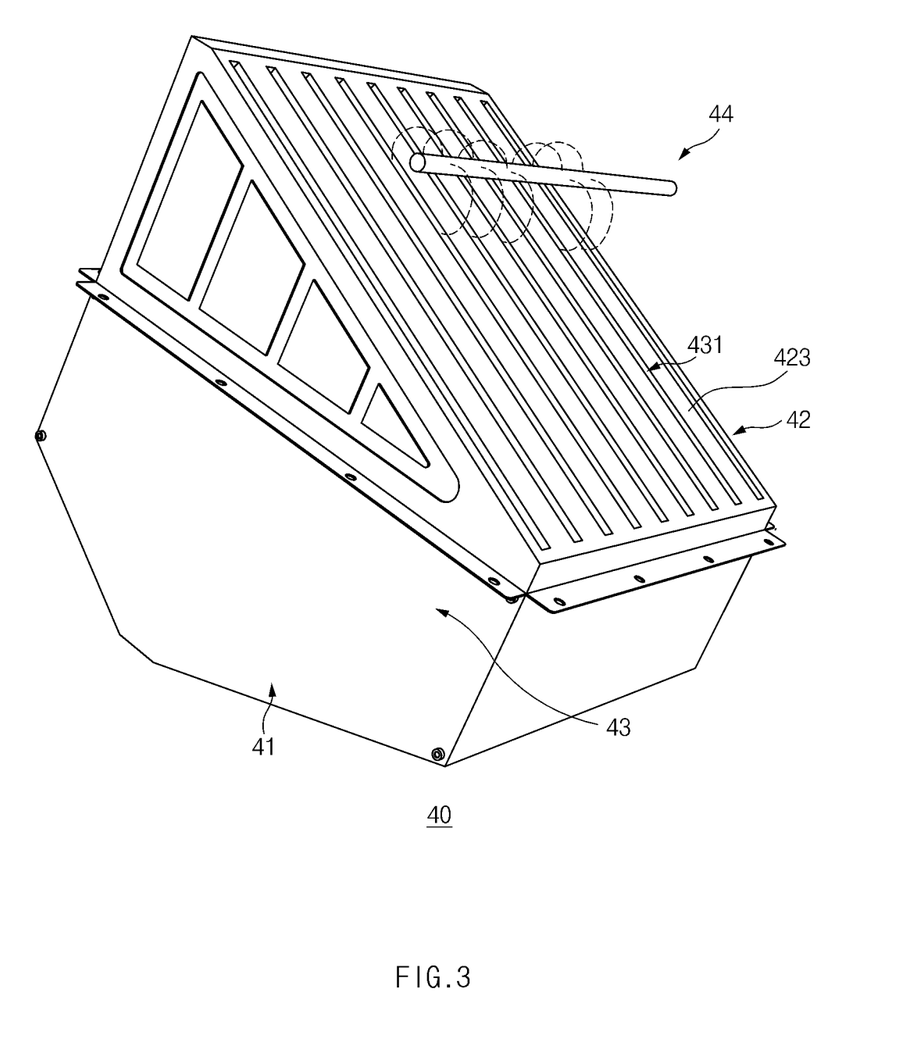
FIG. 3 is a perspective view illustrating the humidification part of FIG. 2, from another angle.
Figure 4:
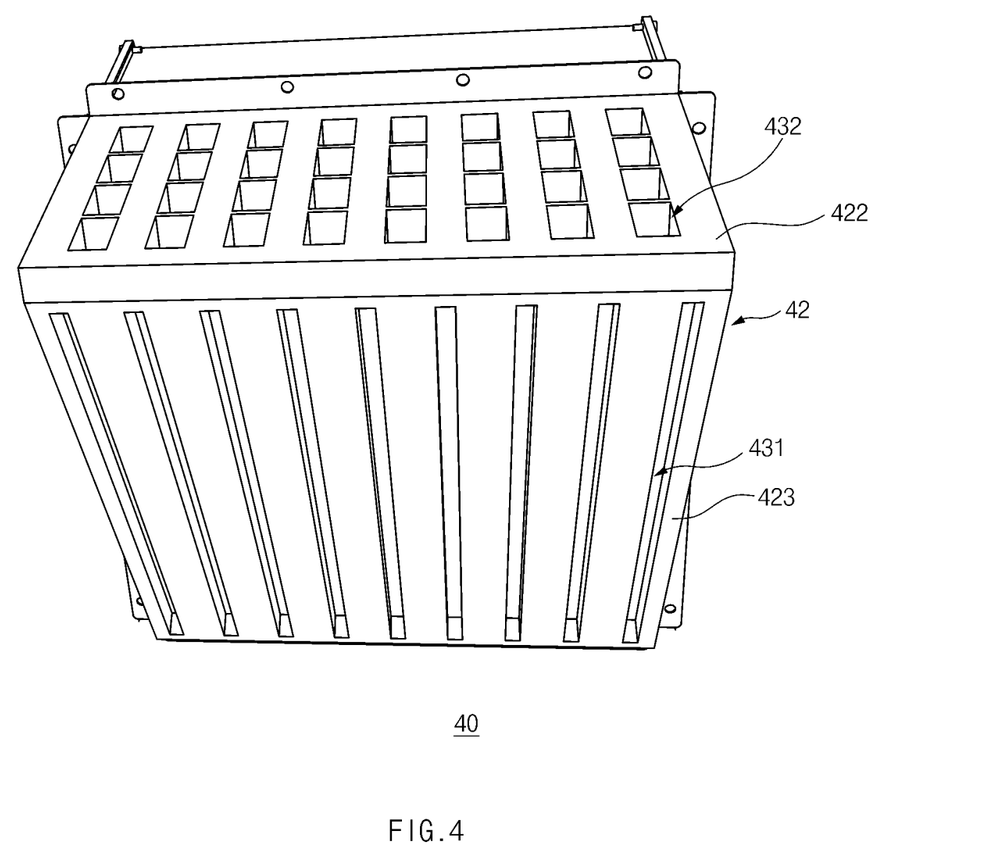
FIG. 4 is a view illustrating the humidification part of the water heater according to the first embodiment of the present disclosure, from an upper side to a lower side.
Figure 5:
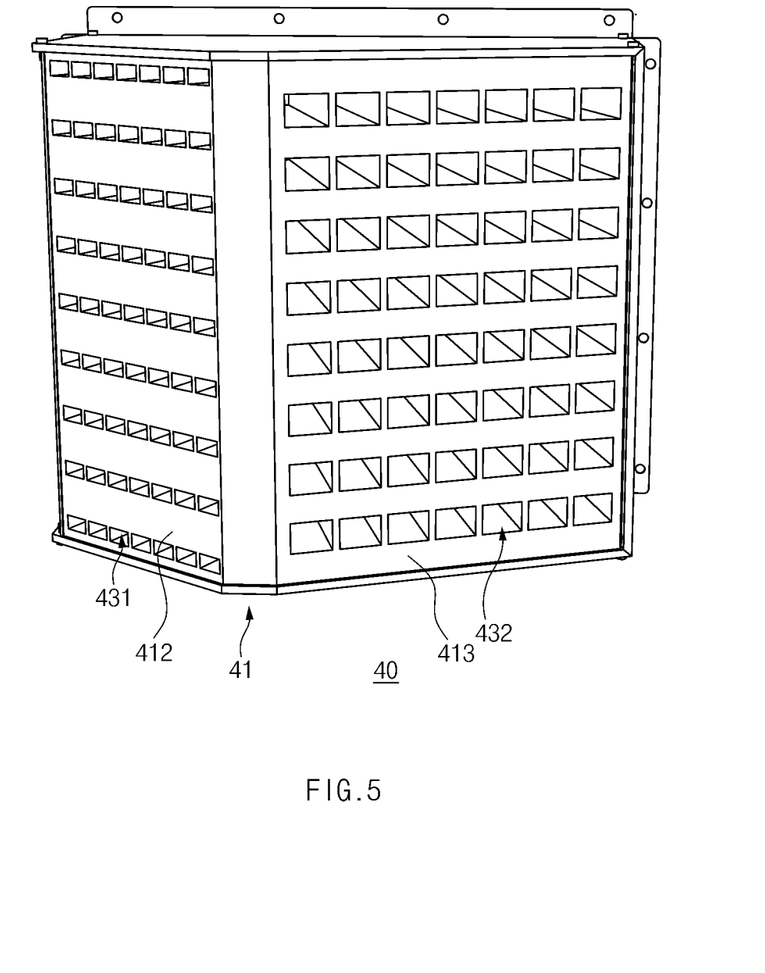
FIG. 5 is a view illustrating the humidification part of the water heater according to the first embodiment of the present disclosure, from the lower side to the upper side.
Figure 6:
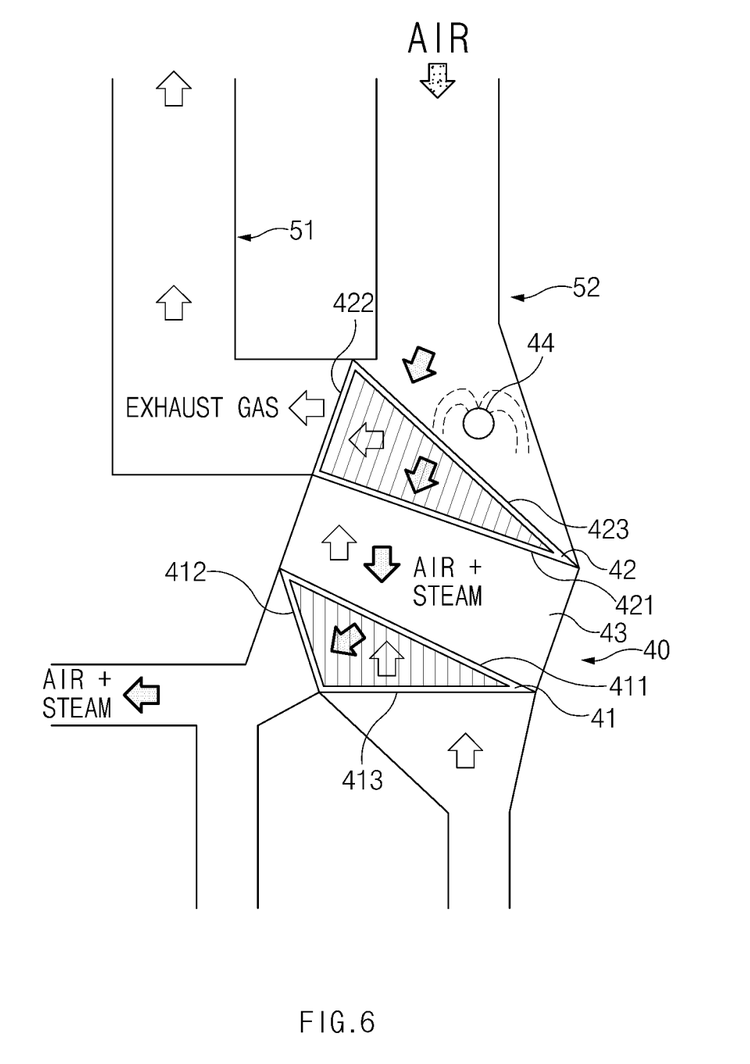
FIG. 6 is a view illustrating flows that occur in the humidification part of the water heater and parts connected to the humidification part, according to the first embodiment of the present disclosure.
Figure 7:
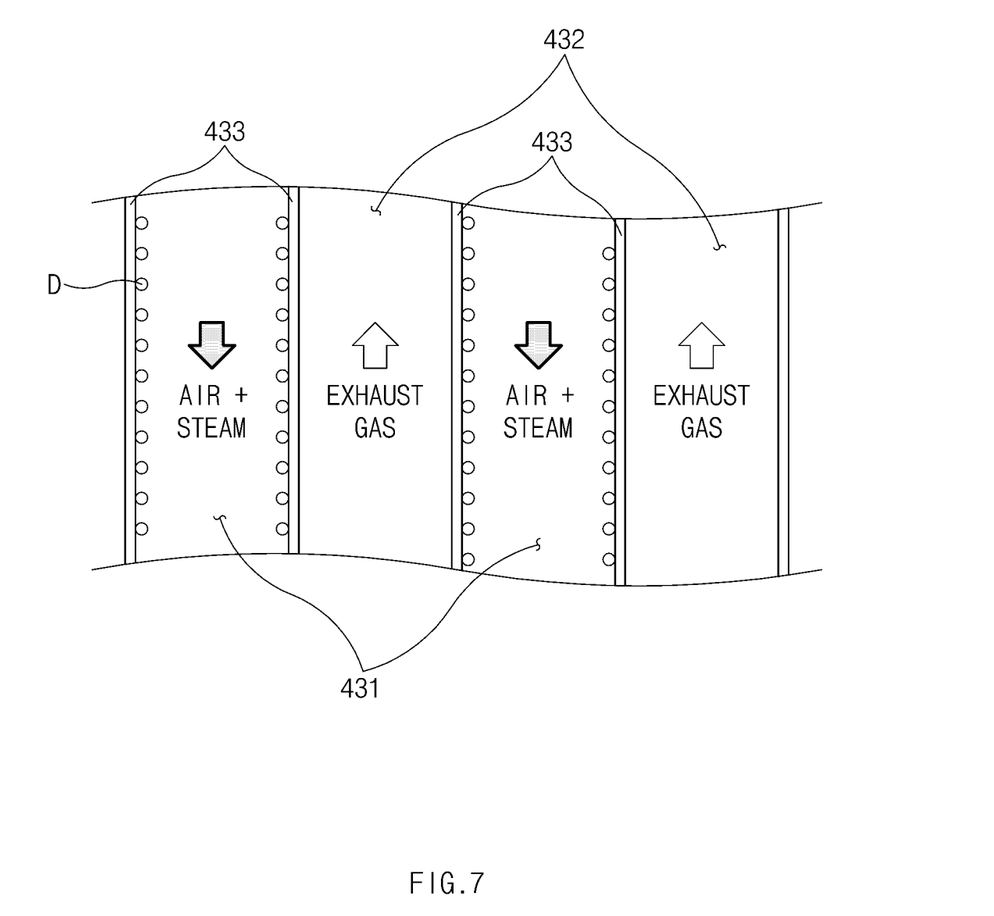
FIG. 7 is a view illustrating flows in wet channels and dry channels of the humidification part of the water heater according to the first embodiment of the present disclosure.

FIG. 2 is a perspective view illustrating the humidification part 40 of the water heater 1 according to the first embodiment of the present disclosure. FIG. 3 is a perspective view illustrating the humidification part of FIG. 2, from another angle. FIG. 4 is a view illustrating the humidification part of the water heater according to the first embodiment of the present disclosure, from an upper side to a lower side. FIG. 5 is a view illustrating the humidification part of the water heater according to the first embodiment of the present disclosure, from the lower side to the upper side. FIG. 6 is a view illustrating flows that occur in the humidification part 40 of the water heater 1 and parts connected to the humidification part 40, according to the first embodiment of the present disclosure. FIG. 7 is a view illustrating flows in wet channels 431 and dry channels 432 of the humidification part 40 of the water heater 1 according to the first embodiment of the present disclosure.

The humidification part 40 is a component that is configured to provide humidified air to the burner 26. The humidification part 40 is configured to generate steam by steaming water and provide the steam, together with the air, to the burner 26. To generate steam, the humidification part 40 may use the combustion gas that is generated through the combustion reaction and is discharged from the heating part 20 after heat is transferred to the heating water. Because the combustion gas has a high temperature after the heat is transferred to the heating water, the humidification part 40 may generate steam by using heat left in the combustion gas. Because the humidification part 40 performs an operation of generating the steam, the humidification part 40 may be formed of a material having a corrosion-resistant property, such as stainless steel, to be prevented from being corroded due to moisture and durability thereof from being degraded.

The humidification part 40 may include a plurality of wet channels 431 and a plurality of dry channels 432. The dry channels 432 provide a space, through which the combustion gas passes, and the wet channels 431 provide a space, through which the air delivered from the outside flows and passes, from which the water is ejected, and in which the ejected water is steamed to become steam. The wet channels 431 and the dry channels 432 may be divided such that different materials cannot be communicated therebetween.

The plurality of dry channels 432 and the plurality of wet channels 431 may be alternately disposed such that heat is efficiently exchanged. Because the dry channels 432 and the wet channels 431 are disposed alternately, a heat exchange area becomes larger, whereby the heat of the combustion gas that passes through the dry channels 432 may be efficiently transferred to water drops "D" formed on inner surfaces of the wet channels 431 after being ejected from the wet channels 431. Furthermore, the fluids that flow in the wet channels 431 and the dry channels 432 may not directly meet each other but may indirectly exchange heat.

The humidification part 40 may include a plurality of partition plates 433. The partition plates 433 having a plate shape may be disposed in parallel to each other at a specific interval, and may define the plurality of wet channels 431 and the plurality of dry channels 432.

The humidification part 40 may further include a plurality of heat transfer fins. The heat transfer fins may be disposed between adjacent partition plates 433. The heat transfer fins may contact at least one of the adjacent partition plates 433 to increase a heat transfer area of the partition plate 433. The heat transfer fins may be disposed on the surfaces of the partition plates 433 to protrude from the surfaces. Among the plurality of heat transfer fins, heat transfer fins that protrude in opposite directions and face each other may contact each other. The heat transfer fins may be disposed on an inner side of the wet channels 431 and the dry channels 432 to increase heat exchange efficiencies in the channels. In the drawings, the heat transfer fins are not illustrated separately.

Among the side surfaces of the partition plates 433, side surfaces that define inner surfaces of the wet channels 431 may be hydrophilic surfaces. A hydrophilic treatment is performed on the inner surfaces of the wet channels 431, and thus they may become hydrophilic surfaces. Chemical etching, a sol-gel method, a surface coating method, and a negative ion exchange method may be used as the hydrophilic treatment. Depressions and bosses may be formed on the inner surfaces of the wet channels 431 such that water drops are generated so that heat may be easily transferred. Because the inner surfaces of the wet channels 431 are hydrophilic, the ejected water may be easily located on the inner surfaces of the wet channels 431, and the heat of the combustion gas that passes through the dry channels 432 may be easily transferred for steaming.

The humidification part 40 may further include a nozzle 44. The nozzle 44 is configured to eject water to the plurality of wet channels 431. The nozzle 44 may be disposed on an upper side of the plurality of wet channels 431, and may be configured such that the ejected water is lowered by the self-weight thereof to be uniformly distributed in the wet channels 431. The nozzle 44 may directly eject the water to the wet channels 431, but may be disposed to eject the water to an upper side while facing the upper side. The nozzle 44 may spray the water in a form of small water drops.

The water may be provided by direct water that is delivered from at least one water source. Accordingly, the nozzle 44 may eject the direct water to the plurality of wet channels 431 by using a direct hydraulic pressure. The nozzle 44 may be connected to the humidifying direct water pipeline 62 to receive direct water.

The humidification part 40 may include a humidification body 43, a first passage guide part 41, and a second passage guide part 42. The first passage guide part 41 may be disposed on a lower side of the humidification body 43 and the second passage guide part 42 may be disposed on an upper side of the humidification body 43, but the dispositions thereof are not limited thereto.

The humidification body 43 may include a main dry channel and a main wet channel. The first passage guide part 41 may include a first passage guide dry-channel and a first passage guide wet-channel, and the second passage guide part 42 may include a second passage guide dry-channel and a second passage guide wet-channel. The dry channel 432 may be formed by sequentially connecting the first passage guide dry-channel, the main dry channel, and the second passage guide dry-channel. The wet channel 431 may be formed by sequentially connecting the second passage guide wet-channel, the main wet channel, and the first passage guide wet-channel. A combustion gas discharge passage, through which the combustion gas flows from the heating part 20 to the outside to be discharged, is formed along the dry channels 432, and an air supply passage, through which the air and the steam are introduced from the outside to the burner 26, is formed along the wet channels 431. The air supplied by the air supply passage and the combustion gas discharged by the combustion gas discharge passage cross each other in the humidification part 40 for heat exchange. In particular, the supplied air and the combustion gas may counter-flow with respect to each other in opposite directions in the humidification body 43 as illustrated, for heat exchange.

The first passage guide dry-channel is configured to guide the combustion gas discharged from the heating part 20 to the main dry channel. Accordingly, the first passage guide dry-channel may be connected to the intermediate pipeline 24 and the humidification body 43. The first passage guide wet-channel is configured to guide the air and the steam discharged from the main wet channel to the burner 26. Accordingly, the first passage guide wet-channel may be connected to the burner air supply pipeline 263 and the humidification body 43.

The second passage guide wet-channel is configured to guide the air supplied from an outside of the humidification part 40 to the main wet channel. Accordingly, the second passage guide wet-channel may be connected to the external air supply pipeline 52, which is a pipeline that is opened to the outside such that the external air is introduced therethrough, and the humidification body 43. The second passage guide dry-channel is configured to guide the steam discharged from the main dry channel to the duct 51. Accordingly, the second passage guide dry-channel may be connected to the duct 51 and the humidification body 43.

The first passage guide may have a first body surface 411 that is a surface connected to the humidification body 43. The outlet of the first passage guide dry-channel and the inlet of the first passage guide wet-channel may be disposed together on, among the side surfaces of the first passage guide, the first body surface 411 that is a surface connected to the humidification body 43. However, the inlet of the first passage guide dry-channel and the outlet of the first passage guide wet-channel may be disposed, respectively, on a first passage guide inlet surface 413 and a first passage guide outlet surface 412 that are, among the side surfaces of the first passage guide, two surfaces that are different from the first body surface 411. That is, when viewed in the same direction as that of FIG. 6, the first passage guide may have a triangular shape. Because the first passage guide outlet surface 412 may be formed to face a lower side, the outlets of the wet channels 431 formed on the first passage guide outlet surface 412 may be opened to face the lower side. Accordingly, the steam included in the supplied air provided through the wet channels 431 or the water injected into the wet channels 431 may flow along the wet channels 431 or drop to reach the inlet of the burner air supply pipeline 263. The outlet of the humidification part 40 may include the outlets of the wet channels 431 formed in the first passage guide part 41, and the outlets of the dry channels 432 formed in the second passage guide part 42.

The second passage guide may have a second body surface 421 that is a surface connected to the humidification body 43. The inlet of the second passage guide dry-channel and the outlet of the second passage guide wet-channel may be disposed together on, among the side surfaces of the second passage guide, the second body surface 421 that is a surface connected to the humidification body 43. However, the outlet of the second passage guide dry-channel and the inlet of the second passage guide wet-channel may be disposed, respectively, on a second passage guide outlet surface 422 and a second passage guide inlet surface 423 that are, among the side surfaces of the second passage guide, two surfaces that are different from the second body surface 421. That is, when viewed in the same direction as that of FIG. 6, the second passage guide may have a triangular shape. However, the shapes of the first passage guide and the second passage guide are not limited thereto.

The first passage guide may be directly or indirectly coupled to the intermediate pipeline 24 of the heating part 20 through brazing welding. The second passage guide may be coupled to the duct 51 through brazing welding. Accordingly, the humidification part 40 may be easily coupled to other components. Furthermore, the components of the humidification part 40 also may be formed as a single body through brazing welding, or all or some components may be integrally formed through a scheme, such as injection-molding. That is, the first passage guide part 41, the second passage guide part 42, and the humidification body 43 have been described in the specification as separate components, but at least some of them may constitute an integral component. The above-described brazing-welded part may be further sealed by further using another unit.

A siphon part 83 may be connected to an inlet of the burner air supply pipeline 263 that connects the humidification part 40 and the combustion part 261, which is connected to the humidification part 40. The siphon part 83 may be a pipe that has a "U"-shaped part to cause a siphon phenomenon and has a serpentine shape. The water that is generated through condensation again as the supplied air including the steam discharged to the burner air supply pipeline 263 is condensed, or the water that is injected into the humidification part 40 but has not been steamed yet, and flows down and drops may gather in the siphon part 83. The gathering water may be collected in the siphon part 83 to define a "U"-shaped trap. When a specific volume or more of water gathers in the siphon part 83, the siphon phenomenon occurs and the water that defines the trap may be discharged at the same time.

Meanwhile, in a modification of an embodiment of the present disclosure, an air/water discharge part including a pipeline connected to a separate valve and an outside, instead of the siphon part 83, may be further formed to be connected to the burner air supply pipeline 263. Similarly to the siphon part 83, the water may be collected in the air/water discharge part, and the water may be discharged to the outside as the valve is opened.

Second Embodiment

Figure 8:
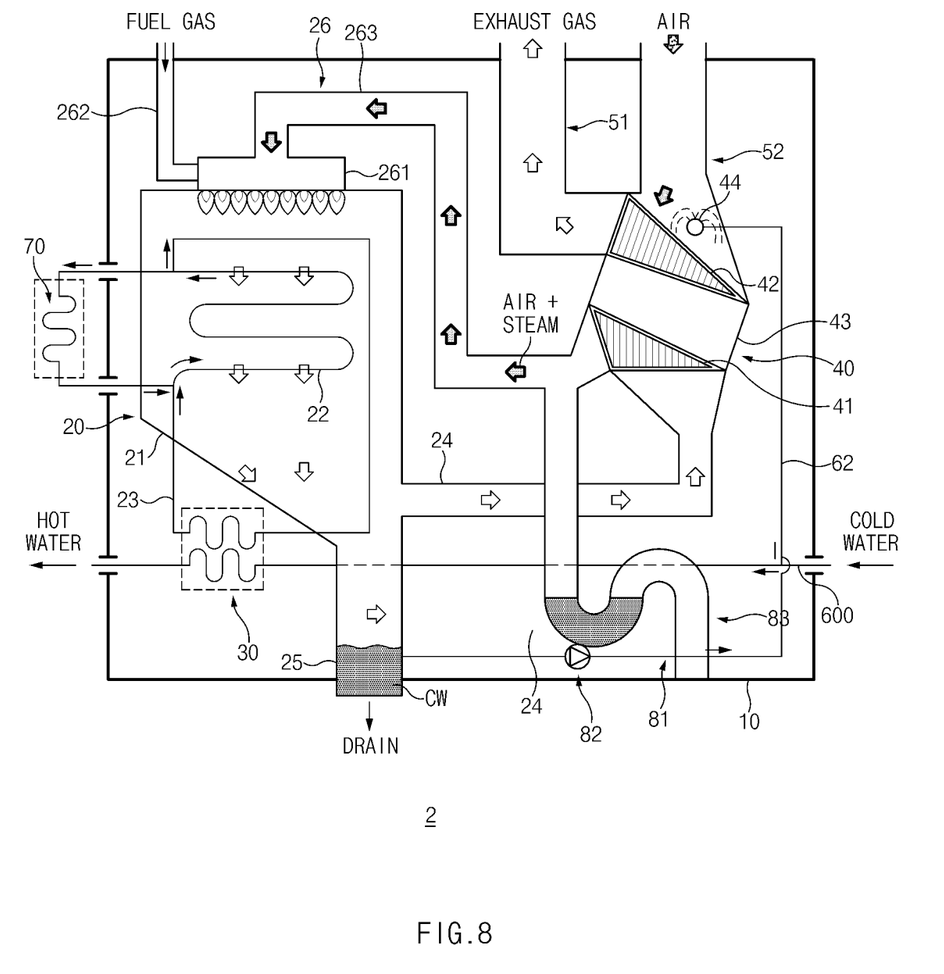
FIG. 8 is a conceptual view of a water heater according to a second embodiment of the present disclosure.

FIG. 8 is a conceptual view of a water heater 2 according to a second embodiment of the present disclosure.

The water heater 2 according to the second embodiment of the present disclosure basically has the same configuration as that of the water heater 1 according to the first embodiment of the present disclosure, except for some parts thereof. Accordingly, only the different parts will be further described. In the water heater 2 according to the second embodiment of the present disclosure, condensate CW instead of direct water may be supplied to the nozzle 44. Accordingly, the water heater 2 may include a pump 82 and a condensate pipeline 81, and may have a direct water pipeline 600 that is not branched from the humidifying direct water pipeline (62 of FIG. 1). The condensate pipeline 81 connects the water discharge pipeline 25, in which the condensate CW gathers, and the nozzle 44, and the pump 82 is disposed in the condensate pipeline 81 to pump the condensate CW to the humidification part 40. The nozzle 44 may eject the condensate CW to the plurality of wet channels 431 by using a pressure applied to the condensate CW by the pump 82.

Although it has been described in the first embodiment and the second embodiment of the present disclosure that the direct water and the condensate CW are ejected by the nozzle 44, the water may be provided by at least one of the direct water and the condensate CW to be ejected, and the water heater, in which both of the direct water and the condensate are ejected by the nozzle or one of them is selectively ejected, may be carried out.

The flames generated by the burner that received humidified air may be stabilized and the temperature of the flames may be made to become lower, by using a scheme, in which the water is ejected to the supplied air and exchanges heat with the combustion gas as in the humidifier of the water heater of the present disclosure. Accordingly, nitrogen oxides and soot may be reduced. Because a concentration of steam in the supplied air may be increased, convection heat transfer and a concentration of radicals may be increased, whereby pollutants may be reduced. Furthermore, because the wasted heat recovery efficiency of the combustion gas increased, more condensate is generated, and fine dust and water soluble nitrogen oxides also may be easily collected.

A higher concentration of steam in the supplied air may be obtained by using a scheme of transferring heat of the combustion gas and heating the water for humidification, as in the scheme of using the water heater of the present disclosure, as compared with a case, in which humidification is made in a scheme of simply ejecting water to the supplied air.

In an steaming/cooing device that has a structure that is similar to that of the humidification part of the present disclosure, the air discharged from an interior may be humidified through steaming while passing through the wet channels, and the exterior air introduced into the interior may be cooled by latent heat during steaming while passing through the dry channels. In the humidification part of the present disclosure, humidification is made through steaming while the combustion gas that is heated to a high temperature passes through the dry channels and the exterior air passes through the wet channels. It may be seen that the exterior air and the interior air, a temperature difference of which is not explicit, exchange heat in the steaming/cooling device, but a temperature difference between the combustion gas of a high temperature and the exterior air is relatively large whereby heat transfer from the combustion gas to the exterior air and the sprayed water may be more effectively made in the humidification part of the present disclosure. Furthermore, in the steaming/cooling device, an obtained advantage is mere because the interior air discharged to the outside is heated. However, according to the humidification part of the present disclosure, a material, such as PVC, which has a relatively low heat-resistant property may be used as a component, such as a duct, which is used for discharging the combustion gas, by cooling the discharged combustion gas, whereby the selection of the material may be widened, and a durability of the components used for discharging the combustion gas may be increased.

Third Embodiment

Figure 9:
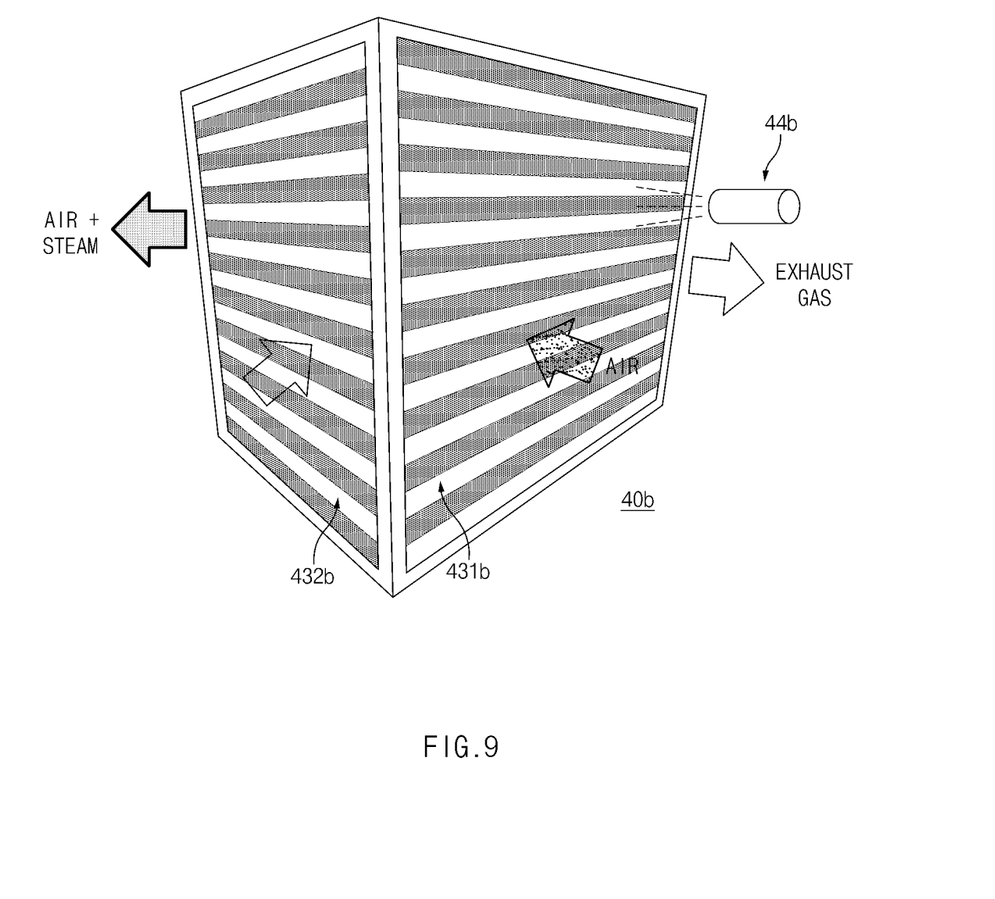
FIG. 9 is a perspective view illustrating a humidification part of according to a third embodiment of the present disclosure.
Figure 10:
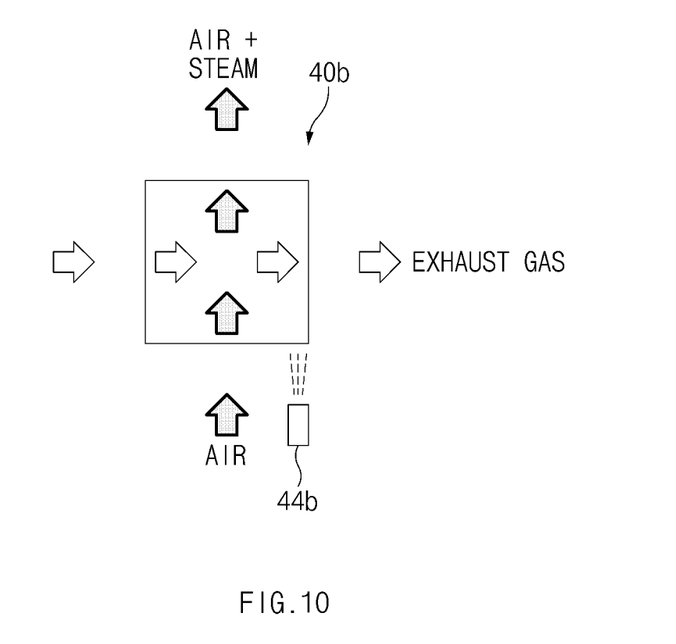
FIG. 10 is a view conceptually illustrating flows that occur in the humidification part according to the third embodiment of the present disclosure.

FIG. 9 is a perspective view illustrating a humidification part 40*b* of according to a third embodiment of the present disclosure. FIG. 10 is a view conceptually illustrating flows that occur in the humidification part 40*b* according to the third embodiment of the present disclosure.

Configurations of the humidification part 40*b* according to the third embodiment of the present disclosure are similar to those of the humidification part 40 according to the first embodiment but only some of them are different, and thus only different parts will be additionally described. Referring to the drawings, the humidification part 40*b* according to the third embodiment of the present disclosure may have a rectangular parallelepiped shape as illustrated. Wet channels 431*b* and dry channels 432*b* may be stacked alternately along an upward/downward direction. Accordingly, the supplied air and the combustion gas that flow in the wet channels 431*b* and the dry channels 432*b* may not directly meet each other but may indirectly exchange heat.

The inlets and the outlets of the wet channels 431*b* may be disposed, respectively, on the front surface and the rear surface of the humidification part 40*b*, which is viewed in the drawing, and the inlets and the outlets of the dry channels 432*b* may be disposed, respectively, on the left side surface and the right side surface of the humidification part 40*b*. Accordingly, as viewed in the drawings, the supplied air that flows through the wet channels 431*b* and the combustion gas that flows through the dry channels 432*b* may indirectly cross each other in a form of cross-flows, in an interior of the humidification part 40*b*. Because the humidification part 40*b* according to the third embodiment of the present disclosure is formed as illustrated, the humidification part 40*b* having a simplified configuration and a reduced volume may be constituted.

A nozzle 44*b* for ejecting water to the wet channels 431*b* may be disposed to be adjacent to the front surface of the humidification part 40*b*. The nozzle 44*b* may apply the steaming water to the wet channels 431*b* in a scheme of ejecting water strongly toward the rear side, unlike the nozzle 44 of the first embodiment, which is formed such that the inlets of the wet channels 431 face the upper side to inject the water in a scheme of dropping the water. The nozzle 44*b* may be disposed on a front side of the front surface of the humidification part 40*b*, may be disposed to be adjacent to an upper end of the front surface, and may be inclined in a direction that becomes closer to the front surface of the humidification part 40*b* with respect to the lower side to uniformly eject the water to the wet channels 431*b*.

Although it has been described in the third embodiment that the wet channels 431*b* and the dry channels 432*b* of the humidification part 40*b* are disposed to face the horizontal direction, it indicates a relative direction for convenience of description, and the directions, which the wet channels 431*b* and the dry channels 432*b* face may be changed according to an angle, at which the humidification part 40*b* is disposed.

Although it may have been described until now that all the elements constituting the embodiments of the present disclosure are coupled to one or coupled to be operated, the present disclosure is not essentially limited to the embodiments. That is, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not excluded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure are not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

The invention claimed is:

1. A water heater comprising:
a heating part including a burner configured to cause a combustion reaction from air and a fuel, and configured to generate heating water by using heat generated through the combustion reaction; and
a humidification part configured to generate steam by steaming water by using a combustion gas generated through the combustion reaction and discharged from the heating part, and to provide the steam, together with the air, to the burner, and
wherein the humidification part includes:
a plurality of wet channels configured to provide a space, in which the water is ejected, the ejected water is steamed, and the steam is generated, and through which the air passes, and
a nozzle configured to eject the water to the plurality of wet channels and disposed on an upper side of the plurality of wet channels,
wherein each of the wet channels includes:
a main wet channel;
a first passage guide wet-channel configured to guide the air and the steam discharged from the main wet channel to the burner; and
a second passage guide wet-channel configured to guide the air supplied from an outside of the humidification part to the main wet channel,
wherein the plurality of first passage guide wet-channels are spaced apart from each other in a first direction and a second direction that intersect each other,
wherein the nozzle is configured to eject the water in a direction different from a flow direction of the air such that the water and the air face each other,
wherein an outlet of the humidification part, from which the air and the steam, which are to be provided to the burner, is formed to face a lower side of the humidification part, and
wherein the water heater further comprises:
a burner air supply pipeline connecting the outlet of the humidification part and the burner; and
a siphon part connected to a lower side of the burner air supply pipeline on a downstream side of the outlet of the humidification part with respect to a flow direction of the air and the steam, while having a "U"-shaped part such that the water, which is collected, is discharged due to a siphon phenomenon when a volume of the collected water becomes a specific volume or more while the water that flows down from the burner air supply pipeline is collected to define a trap.

2. The water heater of claim 1, wherein the humidification part further includes:
a plurality of dry channels configured to provide a space, through which the combustion gas passes,
wherein the plurality of the dry channels and the plurality of the wet channels are alternately disposed such that the heat of the combustion gas is delivered to the water.

3. The water heater of claim 2, wherein: the humidification part further includes:
a humidification body including a main dry channel;
a first passage guide part including a first passage guide dry-channel configured to guide the combustion gas discharged from the heating part to the main dry channel; and
a second passage guide part including a second passage guide dry-channel configured to guide the combustion gas discharged from the main dry channel to a duct for discharging the combustion gas,
wherein the main wet channels are provided in the humidification body,
wherein the first passage guide wet-channels are provided in the first passage guide part,
wherein the second passage guide wet-channels are provided in the second passage guide part,
wherein the dry channel is formed by sequentially connecting the first passage guide dry-channel, the main dry channel, and the second passage guide dry-channel, and
wherein the wet channel is formed by sequentially connecting the second passage guide wet-channel, the main wet channel, and the first passage guide wet-channel.

4. The water heater of claim 3, wherein an outlet of the first passage guide dry-channel and an inlet of the first passage guide wet-channel are disposed together on, among side surfaces of the first passage guide part, a first body surface that is a surface connected to the humidification body, and an inlet of the first passage guide dry-channel and an outlet of the first passage guide wet-channel are disposed, respectively, on, among the side surfaces of the first passage guide part, two surfaces that are different from the first body surface, and
wherein an inlet of the second passage guide dry-channel and an outlet of the second passage guide wet-channel are disposed together on, among side surfaces of the second passage guide part, a second body surface that is a surface connected to the humidification body, and an outlet of the second passage guide dry-channel and an inlet of the second passage guide wet-channel are disposed, respectively, on, among the side surfaces of the second passage guide part, two surfaces that are different from the second body surface.

5. The water heater of claim 2, wherein the humidification part further includes:
a plurality of partition plates disposed in parallel to each other at a specific interval to define the plurality of wet channels and the plurality of dry channels.

6. The water heater of claim 2, wherein inner surfaces of the wet channels are hydrophilic surfaces.

7. The water heater of claim 1, wherein the water is provided by at least direct water delivered from a source of water, and
wherein the nozzle ejects the direct water to the plurality of wet channels by using a direct hydraulic pressure.

8. The water heater of claim 1, further comprising:
a pump configured to pump condensate generated through condensation of the combustion gas to the humidification part,
wherein the water is provided by at least the condensate, and
wherein the nozzle ejects the condensate to the plurality of wet channels by using a pressure applied to the condensate by the pump.

9. The water heater of claim 1, wherein the humidification part is configured to cause heat exchange while the air and the combustion gas flow in an interior thereof while cross-flowing with respect to each other in opposite directions.

10. The water heater of claim 1, wherein the humidification part is configured to cause heat exchange while the air and the combustion gas flow in an interior thereof while cross-flowing with respect to each other in perpendicular directions.

* * * * *